United States Patent [19]

Clear

[11] Patent Number: 5,673,727
[45] Date of Patent: Oct. 7, 1997

[54] FABRIC TREATING PROCESS

[76] Inventor: Theodore E. Clear, 429 S. Washington Blvd., Hamilton, Ohio 45013

[21] Appl. No.: 377,577

[22] Filed: Jan. 24, 1995

[51] Int. Cl.$^6$ ............... D03J 1/08; D03D 9/00
[52] U.S. Cl. ............... 139/291 R; 139/420 C; 28/143; 28/169; 26/106; 156/148; 442/2
[58] Field of Search ............... 139/291 R, 420 C; 28/143, 169, 166; 26/106; 156/148; 428/255; 442/2

[56] References Cited

U.S. PATENT DOCUMENTS

| | | | |
|---|---|---|---|
| 2,684,319 | 7/1954 | Arnold | 156/148 |
| 3,025,588 | 3/1962 | Eilerman | 28/166 |
| 3,090,102 | 5/1963 | Jannarelli | 28/166 |
| 3,119,169 | 1/1964 | Holbrook | 28/143 |
| 3,234,971 | 2/1966 | Horne et al. | 139/291 R |
| 3,526,565 | 9/1970 | Walter | 139/54 |
| 3,793,686 | 2/1974 | Nisbet et al. | 28/166 |
| 3,881,522 | 5/1975 | Lewis et al. | 139/291 R |
| 3,899,810 | 8/1975 | Stanley et al. | 28/166 |
| 3,930,091 | 12/1975 | Lewis et al. | 139/420 R |
| 3,961,651 | 6/1976 | Balentine, Jr. | 139/291 C |
| 4,116,743 | 9/1978 | Davis | 428/255 |
| 5,477,890 | 12/1995 | Krummheuer et al. | 139/291 R |
| 5,477,891 | 12/1995 | Benesi | 139/383 R |

*Primary Examiner*—Andy Falik

[57] ABSTRACT

A fiberglass mesh process includes coating fiberglass yarn, conveying the coated yarn to a loom without first beaming the yarn, weaving a mesh fabric of said yarn, conveying the mesh fabric to an in-line fabric treating station from said loom, tentering the fabric, slitting the fabric and rolling the fabric. The tentering step includes conveying the fabric through a nip of heated, counter-rotating rollers or heated bars oscillating across the moving fabric.

9 Claims, 1 Drawing Sheet

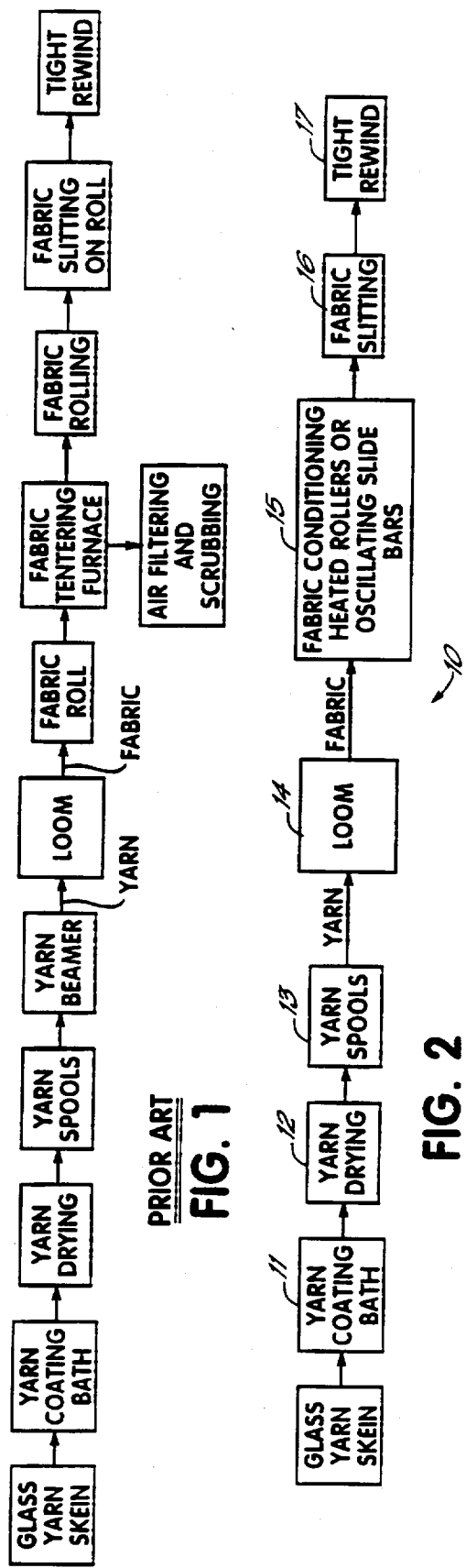
PRIOR ART
FIG. 1
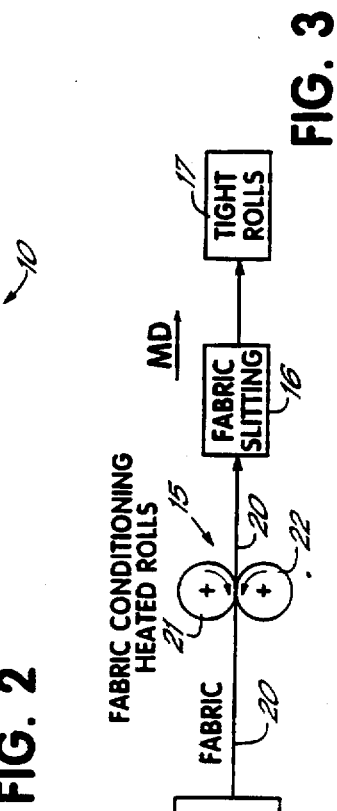
FIG. 2
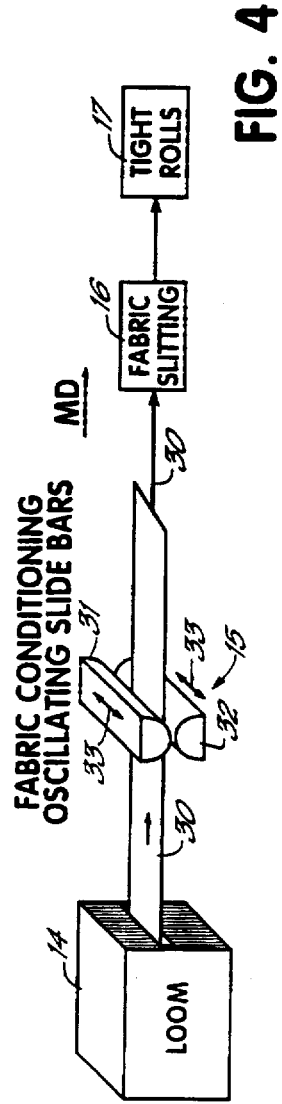
FIG. 3
FIG. 4

FABRIC TREATING PROCESS

BACKGROUND OF THE INVENTION

This application relates to the manufacture of fabrics made from fiberglass and, more particularly, to the treatment of a fiberglass mesh or fabric for use in varied applications.

It is known to produce a fabric or mesh comprised of a weave of fiberglass yarns, which is useful in varied applications. Fiberglass fabric is useful, for example, in laying up on a mold or pattern a resinous composite including a fiberglass fabric or mesh as a layer together with various resins. It is also known to utilize a fiberglass mesh as a reinforcing material in a cementitious or concrete panel, such as that panel disclosed in any of the U.S. Pat. Nos. 3,284,980; 4,203,788; Re. 32,037; Re. 32,038; 4,281,952; Re. 31,921 or 4,420,295. Such panels include a lightweight aggregate core faced on each side or face with a fiberglass mesh material which has been bathed in a slurry of neat cement and pressed against the aggregate core, such that when the neat cement and the aggregate core are cured, there is provided a composite, fiberglass mesh reinforced, cementitious panel. Such panels are useful for a number of building or structural applications. For example, they serve as backer boards for the mounting of ceramic tiles in wet environments and the like, and they also can be used in a number of other applications.

In the manufacture of such fiberglass mesh, it is important to provide a fabric or mesh which is soft of hand and which is compatible with other materials with which the mesh might be utilized. For example, in the alkaline environments of cementitious material, it is necessary that the alkaline does not attack or otherwise damage the fiberglass material. Accordingly, in one prior art process for the manufacture of a fiberglass mesh or fabric, a glass fiber strand from a glass yarn skein is directed through a yarn coating bath, at which time the strand is coated with one or more layers of a plastic or polymer material, dried and thereafter wound onto a yarn spool. These spools are generally mounted on a large holding rack and the elongated strands are then wound on a large spool called a "beamer", which can hold 20,000 or more linear feet of the strand. The beamed material is then juxtaposed to a weaving loom and feeds the loom in the warp or through direction. A single strand is also fed across the loom by various means in a 90° direction to the warp, and is called the "woof" or "weft" direction.

Once the loom weaves the yarn into a mesh or fabric, the finished "beam" is transported to another area to be "tentered". In the tentering process, the mesh is subjected to heat which is sufficient to bind the strands in the fabric together. Thus the strands in the fabric in the warp and weft directions are secured to render the fabric more stable. In the prior art process, tentering requires several people to load the tentering apparatus and to observe and unload the material after it goes through a furnace of about 350°. The mesh must be kept on the move in the tentering furnace, otherwise the mesh becomes hard of hand. In addition, if too much heat is applied through excessive temperatures in the tentering furnace or to a slow down or stoppage of the web in the furnace, the coating can be damaged, leaving the yarn exposed to the alkalines in the cementitious products in which the fabric is used. For example, too much heat can cause the coating to "bubble" and open bubbles expose the yarn.

Upon exiting the fabric tentering furnace, the fabric is rolled and slit at the same time. Some of the slit rolls require rewinding tightly in order to provide a tight roll.

The various spool winding and unwinding steps and the tentering furnace require extra time and floor print or space, in a mesh-producing facility. Moreover, the process is not in-line but rather the material is transported at various stages from one process area to another, requiring personnel to oversee the moves.

In addition, it will be appreciated that the tentering process is subject to certain environmental considerations. Since the tentering is done in a furnace, the air in the furnace must generally be filtered and scrubbed, so that the exhaust air complies with various environmental requirements. Accordingly, such prior art process, which is illustrated diagrammatically in FIG. 1 of this present application, inherently involves a number of disadvantages.

Accordingly, it is one objective of the invention to provide an improved fiberglass mesh process which can be carried out with less expense and labor intensity and with less environmental impact than the prior art processes.

Another objective of the invention has been to provide an in-line continuous process for manufacturing fiberglass mesh useful in cementitious applications.

Another objective of the invention has been to provide an improved tentering process.

To these ends, a preferred embodiment of the invention includes a mesh production process wherein one or more strands of yarn from one or more yarn skeins are run through a coating bath, dried and rolled. Instead of yarn spools from the drying line being combined into a yarn beamer, the yarn is directly conveyed to a loom from which a fiberglass mesh is produced, Thereafter, the fabric is directly conveyed to a fabric conditioning system, rather than being rolled and then introduced to a fabric tentering furnace at another area in the facility. In this regard, the fabric is conveyed through a heating and treating station which treats the fabric to "tenter" the fabric, yet without subjecting it to a fabric tentering furnace. In particular in one embodiment, the fabric is conveyed between two heated rollers, the rollers being heated to such an extent and the fabric moved therebetween at such a velocity to tenter or set the overlapping fabric strands together in order to provide a soft hand fabric material. Preferably, the rolls are counter-rotating with respect to the direction of movement of the fabric, for the purpose of engaging the fabric and further treating it to provide the soft hand.

Alternatively, the fabric is conveyed from the loom between two heated wiper bars oscillating in a perpendicular direction with respect to the fabric motion, The heat imparted to the fabric from the bars serves to tenter it or to set the fiberglass stands with respect to each other, while still providing a fabric mesh which is soft of hand. At the same time, the oscillating motion of the bars serves to prevent any buildup of material on the bars and to further treat the fabric. Upon exiting from the treating station so described, the fabric is directly slit and is wound up directly in tight rolls, thereby eliminating another fabric rolling step and the potential re-winding step.

Accordingly, it will be appreciated that several steps have been eliminated from the prior art process described above, resulting in a less expensive fabric mesh process, which yet produces a fabric mesh soft of hand and suitable for use in various applications. In particular, the yarn beaming steps of the prior art are completely eliminated. Moreover, the fabric tentering furnace is eliminated, together with its various air filtering and scrubbing components. Also, since the treated fabric is not slit on one roll and rewound on others at the end of the process, it is simply initially slit and wound to provide a tight roll. Accordingly, the various rolling and handling processes attendant the prior art are simply eliminated, thereby reducing the number of people required to manufacture the fabric, the number of process steps, and the foot print or factory space required in the process. A continuous, in-line, less expensive process is thus provided.

Also, the tentering of the mesh is improved, with the heated surfaces always moving or more easily controllable to avoid imparting excessive heat.

These and other objectives and advantages will become readily apparent from the following detailed description, and from the drawings, in which:

FIG. 1 is a diagrammatic illustration of a prior art fabric mesh process as described above;

FIG. 2 is a diagrammatic illustration or flow chart of a fabric mesh process according to a preferred embodiment of the invention;

FIG. 3 is a diagrammatic illustration or flow chart of part of the preferred process of FIG. 2, in which the fabric conditioning station includes two opposed, counter-rotating, heated rollers; and FIG. 4 is a diagrammatic illustration similar to FIG. 3 but showing an alternative fabric conditioning station utilizing oscillated slide bars as opposed to the counter-rotating, heated rollers.

It will be appreciated that this invention is directed to processes for manufacturing fiberglass mesh fabric from fiberglass yarn, which mesh has numerous applications, including use as a reinforcement fabric in cementitious building panels. In such applications it is desirable to use yarns which are not subject to degradation by cementitious materials, and yet which can be used in a fabric providing good hand, that is relatively soft and flexible to benefit handling in the manufacturing process.

Accordingly, and turning to the Figures, there is shown in FIG. 2 a flow diagram illustrating the process 10 of the invention. In the process according to the invention, fiberglass yarn is removed from a glass yarn skein and conveyed to a yarn coating bath, there the yarn is bathed in a coating material of any suitable type, the coating material not constituting a part of this particular invention. Such a coating material may comprise a polymeric material, for example. From the yarn coating bath 11, the yarn is conveyed directly to a yarn drying station 12 and is thereafter wound up on a yarn spool 13. The winding of the yarn onto spools at step 13 is optional, for example, and the yarn could be conveyed directly from the yarn drying process to the looming station 14. At the loom, the yarn is manufactured into a fabric in a well known process. For example, in such process, the yarn comprises the warp portion of the fabric and a similar yarn strand is used as the weft or pick portion, which is interwoven with the warp portion to provide a fiberglass mesh fabric. Any suitable loom can be used, as is well known.

From the looming station 14, the fabric is conveyed directly to a fabric conditioning station 15 for "tentering" the yarn to provide a fiberglass mesh fabric with good hand. Such a tentering process includes subjecting the fabric to heat, as will be described. From the fabric conditioning station 15, the yarn is then conveyed directly to a fabric slitting station 16, where the fabric is slit into the desired widths. From there, the separate fabric strips are tightly wound at a rewind station 17.

From this description, it will be appreciated that the invention provides a continuous in-line process for the manufacture and treating of fiberglass mesh material useful in numerous applications, including cementitious structural panels. For example, from the glass yarn skein, the yarn is coated, dried, woven into a fabric, conditioned, slit and rewound, all in a continuous process. This is accomplished without having to load or construct a yarn beamer and without having to convey the wound treated or coated yarn to a separate location in the factory for looming. It will also be appreciated that from the loom, the fabric is conveyed directly to the fabric conditioning station 15 and it is not necessary to rewind the yarn directly from the loom and then convey it separately to a separate conditioning station. Also, it will be appreciated that it is not necessary to wind the fabric directly from the conditioning station and take it to the slitting operation at another separate location in the factory. Instead, the fabric is slit directly as it comes from the conditioning station 15 and is then tightly rewound in rolls of the appropriate width.

Turning now to FIGS. 3 and 4, there are illustrated therein two different embodiments contemplated at the fabric conditioning station for tentering the fabric without the necessity, for example, of a gas fired furnace. In FIG. 3, the fabric 20 is conveyed directly from the loom through a nip at station 15 formed of rollers 21 and 22. Each of the rollers is heated in any well known manner, such as electrically or by the circulation of heated liquids through the rollers. Moreover, the rollers counter-rotate so that, as the surface of each roller approaches the fabric, it contacts the fabric in a direction opposite to the machine direction MD as shown in FIG. 3. Thus the rollers rotate so their mesh contacting surfaces move oppositely to the motion of the fabric through the process at station 15. The rollers contact the fabric and transfer heat to the fabric sufficiently enough to tenter the fiberglass yarn and to render a fiberglass mesh material of the desired hand, softness and flexibility. Thereafter, the fabric 20, having been tentered, is conveyed directly to the fabric slitting station 16 and is rewound in tight rolls at station 17, as illustrated in FIG. 3.

Turning now to FIG. 4, there is shown an alternative fabric conditioning station 15 for tentering the fabric 30 as it is conveyed directly from the loom 14. In this regard, the alternative fabric conditioning station 15 includes two heated oscillating bars 31 and 32. Each of the bars has a preferably curved surface, as shown, for contacting the fabric and the two opposed bars form a nip-like engagement through which the fabric 30 is conveyed. Each of the bars oscillates in a direction illustrated by the arrows 33 in FIG. 4. The direction 33 is transverse to the machine direction MD, or the direction of the fabric as it runs through the process and through the fabric conditioning station. Thus the bars, in essence, slide across the fabric as the fabric moves between the bars which contact it on each side. Like the rollers in FIG. 3, the bars 31 and 32 of FIG. 4 are heated by any suitable means, such as by electrical heaters, or by circulating heated liquid through the bars. The bars are heated sufficiently so that sufficient heat can be transferred through the fabric as it moves through the oscillating bars and the fabric conditioning station. Thereafter, the treated and tentered fabric mesh 30 is conveyed directly to the fabric slitting station 16 and from there is tightly rewound in a rewind station 17 in rolls of the desired width.

Of course, the bars could be flat and are not necessarily curved.

It will be appreciated with respect to both FIGS. 3 and 4, that the rollers and the bars are heated sufficiently to provide sufficient tentering treatment for the yarn mesh. As well, it will be appreciated that the speed of the mesh through the fabric conditioning station is controlled in relation to the heat available from the rollers or the bars in order to assure the desirable tentering treatment of the mesh. It will be appreciated that the contact of the rollers or the bars on the fabric, together with the heat applied to the fabric, provide sufficient tentering, yet with the soft hand desired in the fabric.

It will also be appreciated that, if necessary, the yarn or the fabric can be accumulated at different stages in the process to accommodate different speeds or different forms of motion of the yarn through the entire process. Such accumulation can be accomplished, for example, by festooning dancer rolls or the like, as is well known, although it is contemplated that no such accumulation will be necessary.

Accordingly, it will be appreciated that the invention provides a continuous in-line process for the manufacture of fiberglass mesh useful in numerous applications, including cementitious structural panels. The yarns are conveyed directly through the process stations without requiring intermediate winding of the yarns or fabrics on rolls which are then cut off and delivered to other stations in different locations.

It will also be appreciated that while an in-line process is preferred, the invention also contemplates a process where the treated yarn is wound up, then supplied to the loom, and conveyed from there directly to the fabric conditioning process as described. The invention also contemplates a tentering process as described without use of a furnace.

These and other modifications and advantages will become readily apparent to those of ordinary skill in the art without departing from the scope of this invention and the applicant intends to be bound only by the claims appended hereto.

I claim:

1. In a process for manufacturing fiberglass mesh fabric, the process steps comprising:
   bathing an elongated, fiberglass yarn strand in a coating material;
   drying said coating material on said strand;
   winding said strand on a spool;
   introducing said strand from said spool to a loom and weaving a fiberglass mesh fabric in said loom;
   conveying said fiberglass mesh fabric in elongated form directly from the loom to an in-line fabric conditioning station, where the fiberglass mesh fabric is heated to tenter the yarn therein; and
   thereafter slitting said fiberglass mesh into strips of fabric and winding said fabric strips into a plurality of rolls of fabric;
   further including the step of conveying the fabric exiting from said loom between two opposed heated rolls at said fabric conditioning station, said rolls forming a nip through which said fabric moves; and
   including the step of conveying said fabric through said nip with the surfaces of said rolls contacting the fabric counter-rotating in a direction opposite to the movement of said fabric through said nip.

2. A process as in claim 1, further including the step of conveying said fabric directly from said heated rolls in elongated form to a fabric slitter where said slitting step is performed.

3. In a process for manufacturing fiberglass mesh fabric, the process steps comprising:
   bathing an elongated, fiberglass yarn strand in a coating material;
   drying said coating material on said strand;
   winding said strand on a spool;
   introducing said strand from said spool to a loom and weaving a fiberglass mesh fabric in said loom;
   conveying said fiberglass mesh fabric in elongated form directly from the loom to an in-line fabric conditioning station, where the fabric is heated to tenter the yarn therein; and
   thereafter slitting said fabric and winding said fabric into a plurality of rolls of fabric; and
   further including the step of conveying said fabric in an elongated form in a direction between a nip formed between the adjacent faces of two opposed oscillating slide bars;
   said fabric moving through said bars and comprising the further step of oscillating said bars end-to-end in a direction transverse to the direction of motion of said fabric; and
   including the further step of heating said bars for heating said fabric at said fabric conditioning station to tenter yarn in said fabric.

4. In a process for manufacturing a fiberglass mesh fabric, including the steps of:
   coating an elongated strand of fiberglass material with a coating material;
   drying said coating material;
   conveying said strand to a fabric loom;
   weaving a mesh fabric from said yarn;
   conveying said fabric directly from said loom to an in-line tentering station and tentering said mesh; and
   thereafter slitting said mesh into strips as it exits said tentering station and winding a plurality of tight rolls of said mesh strips from said loom;
   wherein said steps are carried out continuously and in-line without stopping said yarn and mesh.

5. A process for manufacturing fiberglass mesh material consisting of the steps of:
   drawing a strand of fiberglass yarn from a yarn skein;
   coating said strand with a coating material;
   drying said coating material;
   rolling said strand with said dried coating material thereon, and thereafter conducting the following steps continuously in line:
   unwinding said strand and conveying it directly to a loom;
   weaving a fiberglass mesh material from said strand;
   heating said fiberglass mesh material to tenter said fabric; and
   slitting said fabric and winding a plurality of rolls from said slitted fabric, all without rolling said fiberglass strand on a beamer prior to said looming step, and without rolling said fabric prior to slitting said fabric after said tentering step.

6. In a process for manufacturing fiberglass mesh fabric, the process steps comprising:
   bathing an elongated, fiberglass yarn strand in a coating material;
   drying said coating material on said strand;
   winding said strand on a spool;
   introducing said strand from said spool to a loom and weaving a fiberglass mesh fabric in said loom;
   conveying said fabric mesh in elongated form directly from the loom to an inline line fabric conditioning station, where the fabric is heated to tenter the yarn therein;

thereafter slitting said fabric and winding said fabric into a plurality of rolls of fabric; and wherein the step of heating the fabric to tenter the yarn therein includes the step of engaging at least one side of said mesh with a heated roller surface moving in a direction at mesh contact opposite to movement of said mesh in said conditioning station.

7. In a process for manufacturing fiberglass mesh fabric, the process steps comprising:

bathing an elongated, fiberglass yarn strand in a coating material;

drying said coating material on said strand;

winding said strand on a spool;

introducing said strand from said spool to a loom and weaving a fiberglass mesh fabric in said loom;

conveying said fabric mesh in elongated form directly from the loom to an in-line fabric conditioning station, where the fabric is heated to tenter the yarn therein; and thereafter slitting said fabric and winding said fabric into a plurality of rolls of fabric;

wherein the step of tentering the yarn includes conveying said mesh in a first direction over and in contact with a heated surface and oscillating said heated surface in a second direction disposed at an angle with respect to said first direction.

8. In the process of claim 7, the step of conveying said mesh in said first direction between and in contact with a heated surface on both sides of said mesh.

9. A process for manufacturing fiberglass mesh material from yarn strand continuously and in line consisting of the steps of:

drawing a strand of fiberglass yarn from a yarn skein;

coating said strand with a coating material;

drying said coating material;

conveying said strand directly to a loom;

weaving a fiberglass mesh material from said strand;

heating said fiberglass mesh material to tenter said fabric;

slitting said fabric; and winding a plurality of rolls of mesh from said slitted fabric;

all without rolling said fiberglass strand on a beamer prior to said looming step, all without rolling said fabric prior to slitting said fabric after said tentering step and all in line and continuously.

* * * * *